United States Patent Office 3,419,628
Patented Dec. 31, 1968

3,419,628
PROCESS FOR PREPARING FLUOROCARBON MONOMERS
Martin H. Kaufman and John D. Braun, China Lake, Calif., assignors to The United States of America as represented by the Secretary of the Navy
No Drawing. Filed Mar. 30, 1964, Ser. No. 355,970
1 Claim. (Cl. 260—653.3)

The invention described herein may be manufactured and used by or for the Government of the United States of America for governmental purposes without the payment of any royalties thereon or therefor.

The present invention relates to new fluorocarbon monomers and to the synthesis thereof.

Those concerned with the development of new solid propellant rocket motor grains have long recognized the need for a binder composition with high temperature stability. The fluorocarbon polymers heretofore utilized in solid propellant compositions have the hydrogen and fluorine components arranged in such a manner that the splitting out of these two components from the polymer chain to form hydrogen fluoride occurs at relatively low temperatures. The presence of hydrogen and fluorine on adjacent carbon atoms allows splitting out to form hydrogen fluoride and chain decomposition as shown below:

$$-\left[\begin{array}{cc} F & H \\ | & | \\ C-C \\ | & | \\ F & H \end{array}\right]- \xrightarrow{\Delta} HF + \text{chain breakdown}$$

The present invention is for a fluorocarbon monomer which greatly reduces the possibilities of the hydrogen and fluorine split-out to occur thereby making a material more stable at high temperatures to this type of degradation.

It is therefore an object of this invention to provide fluorocarbon monomers for binders with high-temperature stability for use in solid propellant rocket motor grains.

Another object is to provide a new chemical product to be utilized as a copolymer in the preparation of high-temperature stable rubber.

A further object of the invention is the provision of a method for the synthesis of new and useful polymeric fluorocarbon compositions having desirable chemical and physical properties. Still another object is to provide fluorocarbon monomers which may serve as intermediates for preparing protective coatings.

Yet another object of the present invention is the provision of a process for producing new fluorocarbon monomers in good yields at a rapid rate.

Other objects, features, and many of the attendant advantages of this invention will become readily appreciated as the same become better understood by reference to the following detailed description.

The present invention includes new fluorocarbon monomers of high temperature stability formed by first reacting dichlorotetrafluoroacetone, monochloropentafluoroacetone or hexafluoroacetone in a Grignard reaction and then treating the resulting intermediate alcohol with phosphorus pentachloride. The reaction may be generally represented by the following equation:

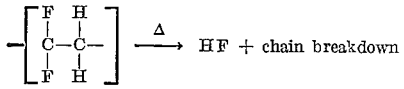

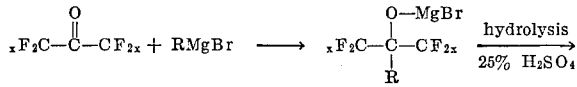

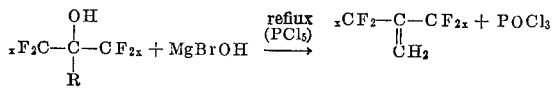

where R is a methyl group ($CH_3$), and $x$ may be chlorine or fluorine.

The following examples are offered for a better understanding of the invention; the process and conditions illustrated by these examples are not to be construed as limiting the invention.

EXAMPLE I

The Grignard reagent used in this invention was methyl magnesium bromide ($CH_3MgBr$) and was prepared as follows:

In a 3-neck flask equipped with a reflux condenser, and a "tru-bore" stirrer 70 grams of magnesium metal was covered with ether. Methyl bromide ($CH_3Br$) was then added via a bubbler until the ether became cloudy as the reaction got underway. Additional ether was added as the reaction proceeded. After about 4 hours the magnesium had disappeared. The methyl bromide bubbler was removed and magnesium was added in small increments of ½ to one gram to consume the excess methyl bromide dissolved in the ether mixture. (The total magnesium metal used in this experiment was 74.5.)

Next, the dichlorotetrafluoroacetone was dissolved in about ½ its volume of ether. This solution was added to the Grignard reagent prepared above, via a dropping funnel at such a rate as to promote gentle reflux. When all the ether-halo-acetone solution had been added, the mixture was stirred for about ½ hour at room temperature. A 25% solution of sulfuric acid ($H_2SO_4$) was then slowly added via the dropping funnel (yielding gentle reflux) until a salt formed and settled out in a hard, crusty layer, having a clear ether liquor above it. The ether liquor was poured off, and the salt remaining in the flask was dissolved in just sufficient water to form a saturated solution. The salt solution was extracted with two 100-milliliter portions of ether. The extractions were combined with the initial ether liquor. The ether liquors, totalling about 1500 milliliters were washed with copious amounts of water, then with 10% sodium hydroxide (NaOH) until neutral or very slightly basic. Anhydrous magnesium sulfate ($MgSO_4$) was then added to the liquor until, when stirred, the liquor remained milky for about 30 seconds. The mixture was then stored in the refrigerator overnight. Next day, the magnesium sulfate ($MgSO_4$) was stirred up from the bottom, and the mixture allowed to set at room temperature for about 30 minutes. The magnesium sulfate was then filtered off, and the liquor distilled to strip off the ether.

This reaction may be generally represented by the following equation:

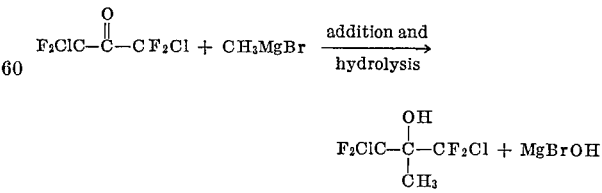

The theoretical yield of alcoholic intermediate, 1,3-dichloro, 1,1,3,3 - tetrafluoro-2-methyl propanol - 2, was 598.5 grams and the actual yield from this experiment was 415.1 grams.

The next step was to treat the 1,3-dichloro, 1,1,3,3-tetrafluoro-2-methyl propanol-2, above prepared, with phosphorus pentachloride thereby, producing the valuable new fluorine monomer, 1,1'-di(chlorodifluoromethyl)ethylene. About 110.5 grams of phosphorus pentachloride were introduced into a 300-ml. 2-neck round-bottom flask fitted with a heating mantle, thermometer, water-cooled coil condenser with Dry Ice trap and drying tube. About 114 grams of alcoholic intermediate (prepared above) were introduced slowly, then the mixture was heated to a gentle reflux. It was allowed to reflux at about 100° C. for about five days. The reaction product was then fractioned and about 120 ml. of material were distilled at the boiling point of 79 to 116° C. The distillation was stopped with about 30 ml. of material remaining in the boiling flask. Upon cooling, free phosphorus pentachloride was observed to precipitate out of the solution. Both the distilled product and the remainder of undistilled material were poured over crushed ice to hydrolyze the halo-phosphorus compounds present. The undistilled material left a dirty yellowish layer at the bottom of the flask. The distilled material left a layer which was almost clear. The organic layers of both hydrolysis mixtures were separated and washed with sufficient water to render the materials neutral. The washings in turn were salted with sodium chloride, neutralized with 5% potassium hydroxide, and extracted with ether, the ether extracted being combined with its respective organic layer. Both were placed over anhydrous magnesium sulfate (MgSO$_4$) to dry. After about 8 hours, the low-boiling distillate was filtered off and placed over a desiccant (anhydrous calcium sulfate) to dry. The low-boiling distillate was then filtered from its desiccant and fractionated.

This reaction may be represented by the following equation:

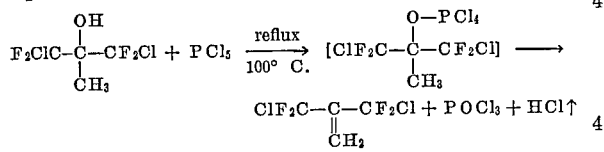

The theoretical yield of fluorine monomer, 1,1'-di(chlorodifluoromethyl)ethylene from 97 grams of intermediate alcohol is 88.9 grams (17 grams of the starting alcohol were recovered). The actual yield by this method was 57.2 grams, or a 64.3% yield.

EXAMPLE II

Using the same procedure as described in Example I herein, monochloropentafluoroacetone was reacted with Grignard reagent to produce the intermediate alcohol (1-chloro,1,1,3,3,3-pentafluoro,2-methyl propanol-2) which when treated with phosphorus pentachloride produced the fluorine monomer, 1-chlorodifluoromethyl-1'-trifluoromethyl ethylene.

The reaction may be represented as follows:

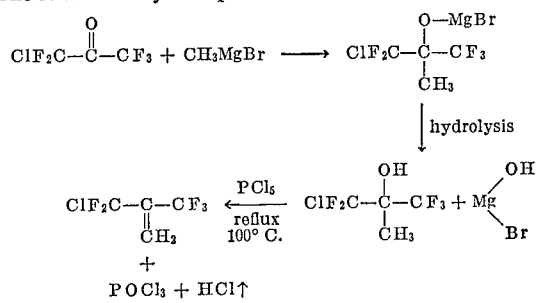

The new fluorine monomers of this invention have a third carbon atom interposed between the carbon atoms carrying hydrogen and fluorine which greatly reduces the possibilities of hydrogen and fluorine split out to form hydrogen fluoride. Copolymers may be prepared with these monomers which also would not have hydrogen and fluorine on adjacent carbon atoms and would be of such a nature that they would probably withstand high temperature without breakdown.

Obviously, many modifications and variations of the present invention are possible in the light of the above teachings. It is therefore to be understood that within the scope of the appended claims the invention may be practiced otherwise than as specifically described.

What is claimed is:
1. The method of preparing fluorine monomers which comprises:
    refluxing the alcoholic intermediate, prepared by hydrolysis of the product formed by the reaction of a member selected from the group consisting of dichlorotetrafluoroacetone, monochloropentafluoroacetone and hexafluoroacetone with a Grignard reagent, and
    phosphorus pentachloride at a temperature of about 100° C. for about five days.

References Cited

UNITED STATES PATENTS 2,980,738  4/1961  Scribner _____ 260—633
2,852,573  9/1958  Blout et al. _____ 260—653.3

OTHER REFERENCES

Haszeldine: Jour. Chem. Soc. (1953), pp. 3565–3575.
McBee et al.: J. Amen. Chem. Soc., vol. 74, pp. 1736–1737, 1952.
Simons: Fluorine Chemistry, vol. V (1964), pp. 486–488, Academic Press Inc., New York.
Farber: Astronautics, vol. 5, August 1960, pp. 34, 40, 42.

LEON ZITVER, *Primary Examiner.*

H. MARS, *Assistant Examiner.*

U.S. Cl. X.R.

260—633; 149—19, 109